April 16, 1968

J. W. GREER ET AL 3,378,111

FLUID OPERATED FRICTION COUPLING WITH AIR CUSHION
AND QUICK SLACK TAKEUP

Filed May 19, 1966

INVENTORS:
STANLEY L. PIERCE JR.
JOHN W. GREER
GEORGE W. SCHULZ

ATTORNEYS.

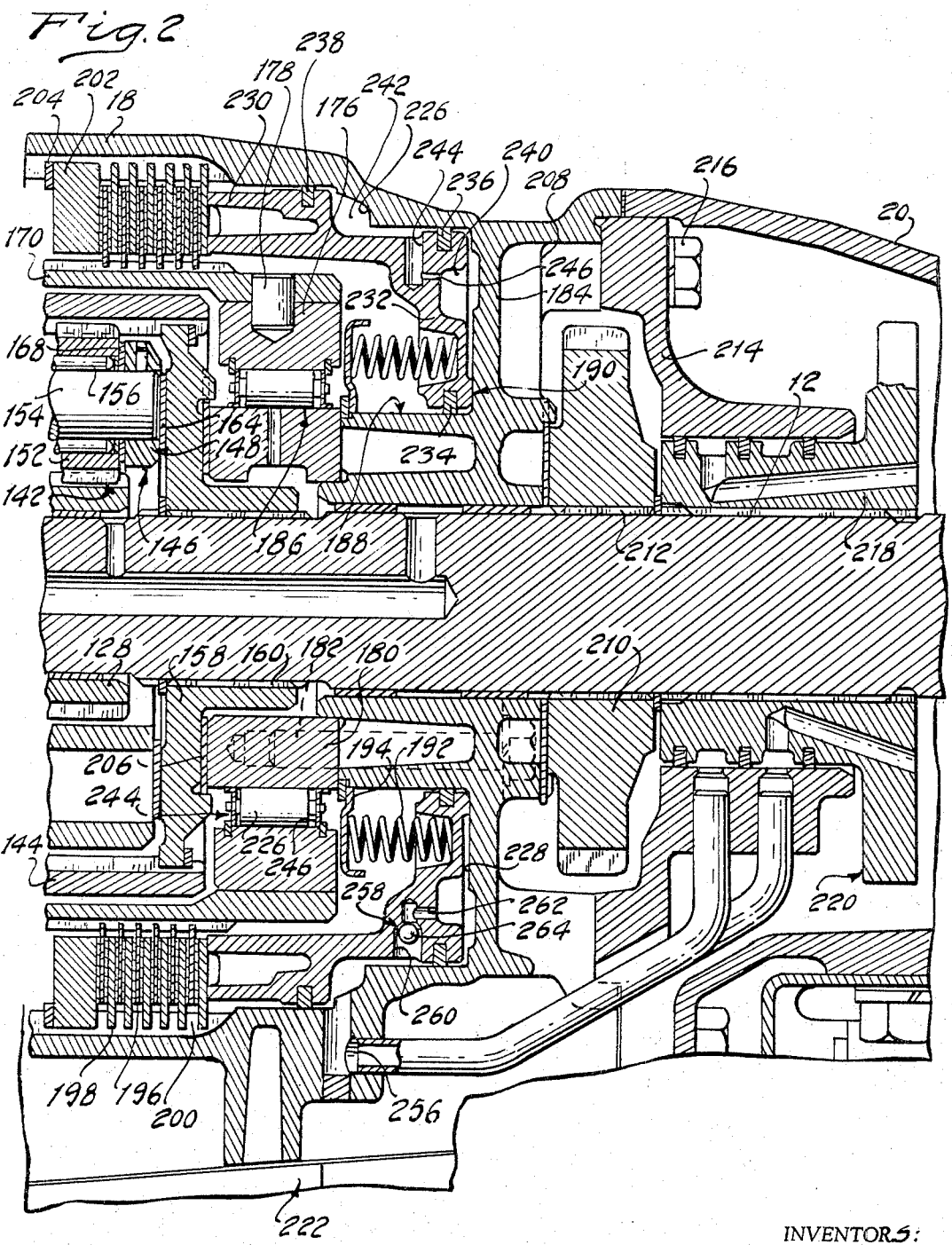

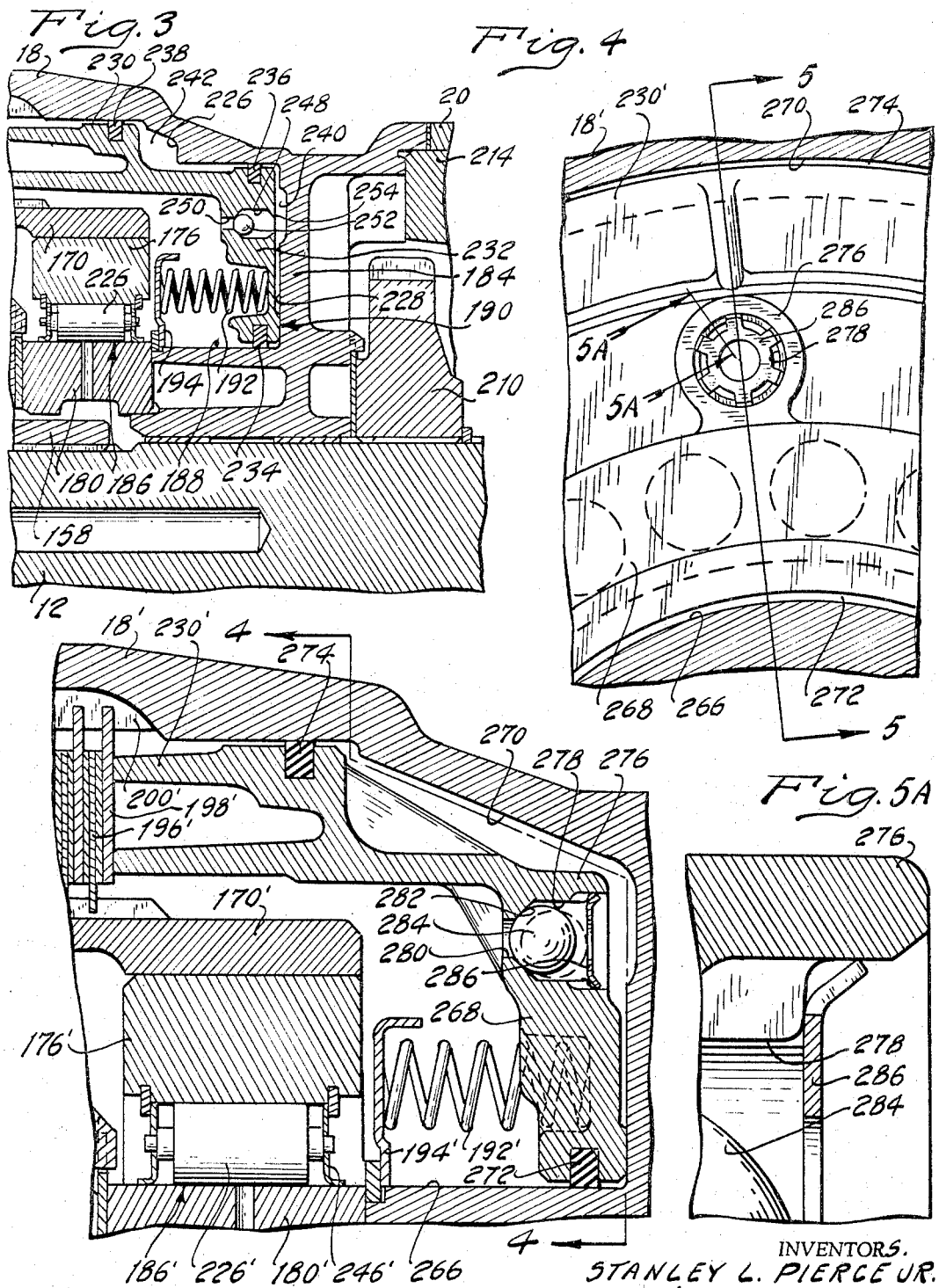

3,378,111
FLUID OPERATED FRICTION COUPLING WITH AIR CUSHION AND QUICK SLACK TAKEUP
John W. Greer, Birmingham, Stanley L. Pierce, Jr., Madison Heights, and George W. Schulz, Dearborn Heights, Mich., assignors to Ford Motor Company, Dearborn, Mich., a corporation of Delaware
Filed May 19, 1966, Ser. No. 551,315
6 Claims. (Cl. 188—152)

ABSTRACT OF THE DISCLOSURE

This specification describes a friction disc coupling for controlling the motion of gear elements in a multiple-ratio torque delivery gear system. It includes an annular cylinder and an annular piston which cooperate to define a pressure cavity. An air passage communicating with the cavity permits entry of a controlled quantity of air as fluid is exhausted from the cavity. The flow of air is controlled by a one way flow valve in the air passage. The air in the cavity provides an accumulator function which cushions the application of the coupling.

Our invention relates generally to friction torque establishing devices in a torque delivery driveline, and more particularly to improvements in a fluid pressure operated servo for a friction disc coupling.

The improvements of our invention can be embodied in any one of several gearing arrangements used in automotive vehicle power transmission systems for controlling the relative motion of the gear elements of the system to produce driving speed ratio changes. In the preferred embodiment herein disclosed we have used our improved pressure operated servo to control the engagement and release of friction discs for a reaction brake which in turn controls the motion of a planetary carrier in a multiple speed ratio, planetary gear system for an automotive vehicle driveline. When the brake is applied, it is capable of acting as a reaction point for the gear system thereby permitting the driveline to multiply torque.

In an arrangement of this type it is necessary to avoid shock loads and inertia forces upon application of the brake. For this reason it is desirable to provide an accumulator action for the servo to cushion the brake engagement and effect a smooth transition in the establishment and disestablishment of the torque delivery path.

The provision of such a fluid operated brake servo having the desired accumulating action is an object of our invention.

It is a further object of our invention to provide a fluid pressure operated servo for a friction disc assembly wherein the engagement of the friction discs during the initial portion of the operating cycle will take place rapidly and wherein the desired cushioning characteristic during the latter stages of the operating cycle of the servo occurs after the friction discs are partially engaged.

It is another object of our invention to provide a friction disc servo of the type above set forth wherein the engagement of the friction discs will be caused to take place with a cushioning action without increasing the total servo engagement time interval.

It is a further object of our invention to provide a friction disc servo of the type above set forth wherein the cushioning action can be accomplished without the necessity for providing a complex accumulator valve system and without incurring a cost or space penalty.

For the purpose of describing more particularly the improvement of our invention, reference will be made to the accompanying drawings, wherein:

FIGURE 2 is a partial cross-sectional view of the mechanism of FIGURE 1 showing a compound servo piston;

FIGURE 3 is a partial cross-sectional view of the piston of FIGURE 2 although it is taken on a different radial cross-sectional plane;

FIGURE 4 is an end view, as seen from the plane of section line 4—4 of FIGURE 5, of an annular piston for an alternate servo construction; and FIGURES 5 and 5A are cross-sectional views of the alternate construction of FIGURE 4 taken along the plane of section line 5—5 of FIGURE 4;

Figure 1:
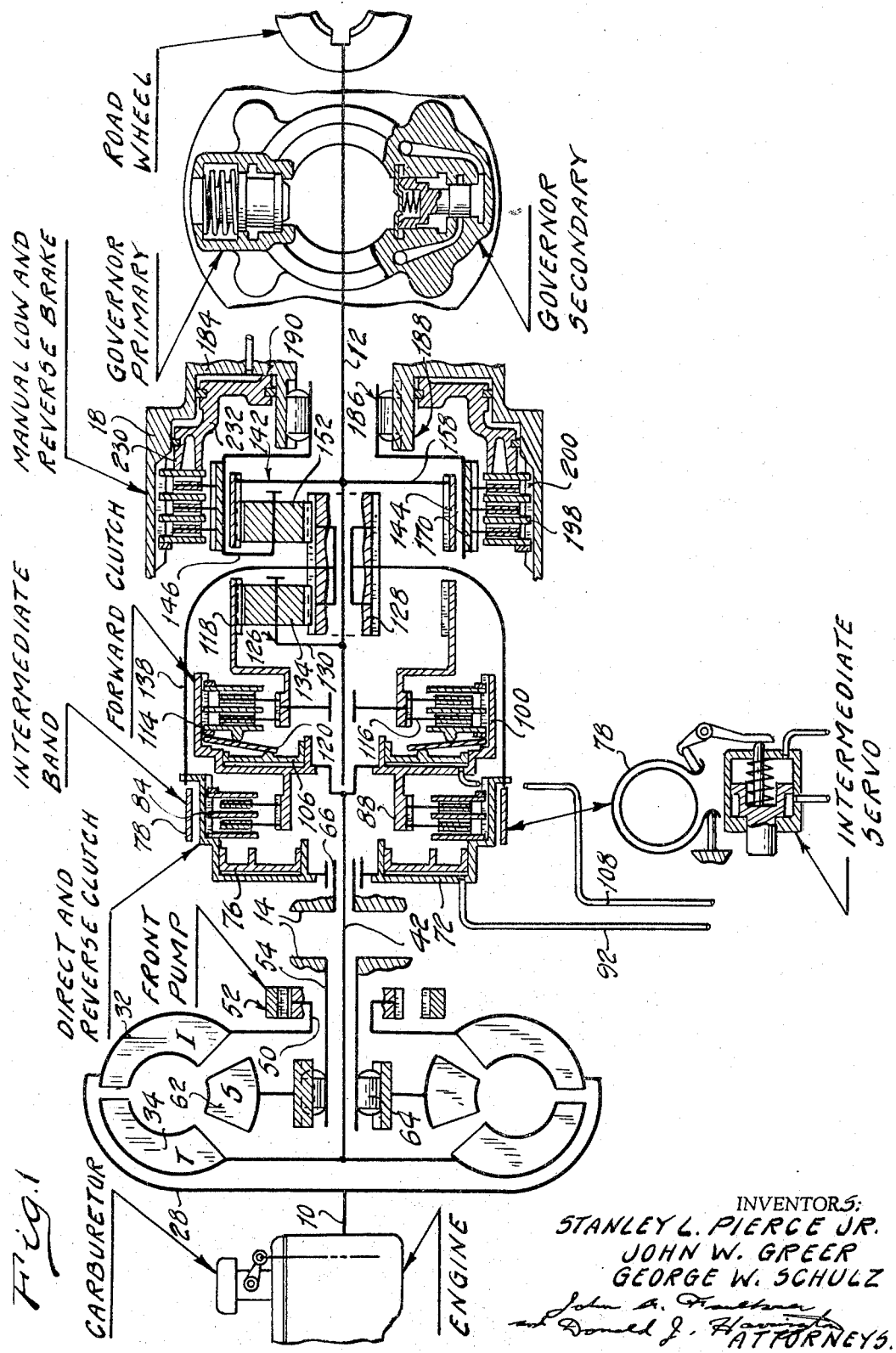
FIGURE 1 shows in schematic form a power transmission system having our improved servo.

In FIGURE 1, reference numeral 10 designates the crankshaft of an internal combustion vehicle engine for an automotive vehicle driveline. Numeral 12 designates a power output tailshaft which may be connected by means of a driveshaft and differential and axle assembly to the vehicle traction wheels.

The transmission assembly includes a transmission housing 14 having a converter housing portion, a planetary gear housing portion 18 and a tailshaft housing portion 20. The converter housing encloses a hydrokinetic torque converter unit having an impeller shell which is drivably connected to a drive plate 28. The hub of drive plate 28 is connected to the internal combustion engine crankshaft 10.

The impeller shell carries impeller blades 32 which are situated in juxtaposed fluid flow relationship with respect to turbine blades 34. These blades form a part of a turbine assembly having a hub which is splined to a turbine driven shaft 42.

A transmission support connected to the housing 14 is provided with a central opening which receives an impeller shell supporting sleeve shaft 50. Sleeve shaft 50 is keyed or splined to the driving element of a positive displacement pump assembly 52 which acts as a source of fluid pressure for an automatic control valve system not shown. The control valve system controls the application and release of friction torque establishing devices in the gear mechanism, which will be explained subsequently.

A stator sleeve shaft 54 received within the sleeve shaft 50 supports the hub of a stator assembly. This assembly includes blades 62 which define in part bladed fluid flow passages extending from the exit section of the turbine blades 34 to the flow entrance region of the impeller blades 32. Overrunning brake rollers 64 situated in the stator hub inhibit rotation of the stator assembly 60 in a direction opposite to the direction of rotation of the impeller, but it permits free-wheeling motion of the stator assembly in the opposite direction.

Stator shaft 54 is connected directly to a clutch support member 66 which is bolted to the wall 44. Support member 66 is formed with a sleeve extension upon which is rotatably journaled a brake drum 72. This drum defines an annular cylinder within which is slidably received an annular piston 76. Intermediate speed ratio friction brake band 78, which surrounds drum 72, may be applied and released by means of a suitable fluid pressure operated intermediate servo, as shown.

Piston 76 is urged in a left-hand direction, as viewed in FIGURE 1, by a plurality of piston return springs. Drum 72 is internally splined to provide a driving connection with mating, externally splined clutch discs 84. These are situated in an interdigital relationship with respect to internally splined clutch discs 86 carried by an externally splined clutch element 88. A clutch backup plate also is externally splined to the drum 72 and is held axially fast by a snap ring as indicated.

Drum 72 and piston 76 cooperate to define a pressure cavity that communicates with the fluid pressure feed passage 92 formed in the drum 72. This passage in turn communicates with a fluid pressure distributor passage by means of an annular groove formed in the member 66. Lubrication passages also are provided in the member 66.

Clutch element 88 forms a part of a clutch member 100 which is splined to the turbine driven shaft 42. Clutch member 100 is formed with an annular cylinder within which is received a cooperating annular piston 106. Member 100 and piston 106 cooperate to define a pressure cavity that is in fluid communication with the pressure feed passage 108 formed in the member 100. This passage in turn communicates with a passage formed in member 66.

Clutch member 100 is internally splined to externally splined clutch discs 114. These are situated in interdigital relationship with respect to internally splined clutch discs 116 carried by an externally splined portion of ring gear 118. Upon distribution of fluid pressure to the passage 108, the fluid pressure force developed on piston 106 is transmitted through Belleville spring 120 to a pressure plate and hence to the multiple disc clutch assembly shown at 114 and 116. A reaction plate carried by the member 100 is held axially fast by a snap ring. Belleville spring 120 functions to multiply the force of the piston 106 and to cushion application of the multiple disc clutch assembly as pressure is distributed to the passage 108. It functions also as a piston return spring which moves the piston 106 in the left-hand direction when pressure in passage 108 is exhausted.

Ring gear 118 forms a part of a simple planetary gear unit 126. This gear unit includes also a sun gear 128, a carrier 130 having pinion shafts, and a plurality of planetary pinions 134 that are rotatably journaled upon pinion shafts. Carrier 130 is splined to power output shaft 12.

Brake drum 72 is drivably connected to the sun gear 128 by means of a drive shell 138. This shell is keyed or splined to the drum 72, and it extends over the forward clutch assembly shown at 114 and 116 and over the planetary gear unit 126. Its inner periphery is internally splined to establish a driving connection with sun gear 128.

A second planetary gear unit 142 includes a ring gear 144, a carrier 146, and the sun gear 128. The sun gear is common to both planetary gear units 126 and 142. Carrier 146 includes a first ring portion 148 and a second ring portion, not shown, which are situated on opposite sides of planetary pinions 152. These in turn are journaled upon pinion shafts 154. Needle bearings 156 function as a bearing means for the pinions 152. Pinion shafts 154 are end-supported by the carrier rings.

Pinions 152 engage ring gear 144 and sun gear 128. Ring gear 144 is drivably connected to a torque transfer member 158 which is splined at 160 to the power output shaft 12.

A thrust washer is disposed between the drive shell 138 and the pinion shafts 154. Another thrust washer 164 is disposed between torque transfer member 158 and the pinion shaft 154. Thrust washers, one of which is shown at 168, are situated on opposed sides of the pinions 152 adjacent the carrier rings.

A multiple disc brake drum 170 surrounds ring gear 144. It is connected drivably to carrier 146. An overrunning brake outer race 176 is carried by the right-hand margin of drum 170. Retainer pins 178 can be received through cooperating radial openings formed in the race 176 and the drum 170. An overrunning brake inner race 180 is secured by means of bolts 182 to an end wall 184 of the transmission housing portion 18. An overrunning brake assembly, identified generally by reference character 186, is situated between the races 176 and 180.

The wall 184 defines an annular cylinder 188 within which is positioned an annular piston 190. A piston return spring 192, which acts upon the piston 190, is seated upon a spring seat in the form of a disc 194. A snap ring is provided for holding the disc 194 axially fast.

Fluid pressure may be admitted into the cavity that is defined by the cylinder 188 and the piston 190, although the passage structure is not specifically disclosed. Brake drum 170 is externally splined to facilitate a driving connection with internally splined brake discs 196. These are situated in interdigital relationship with respect to externally splined brake discs 198 carried by an internally splined portion 200 of the housing portion 18. A brake reaction ring 202 also is secured to the housing portion 18, and it is held axially fast by means of a snap ring 204.

When fluid pressure is admitted to the pressure cavity defined by the cylinder 188 and the piston 190, the piston 190 is urged in a left-hand direction to cause multiple disc clutch assembly 196 and 198 to anchor brake drum 170.

A thrust washer 206 is situated between the torque transfer member 158 and the overrunning brake inner race 180.

The carrier 146 can float with respect to the brake drum 170 and the brake drum is supported only by the loose connection with carrier 146 and by the control ring that forms a part of the overrunning brake assembly 186. No special bearing support sleeve or bushing is required.

The end wall 184 is recessed at 208 to accommodate a parking gear 210, which is splined at 212 to the power output shaft 12. A fluid pressure manifold cover 214 is bolted at 216 to the end wall 184. It is provided with a sleeve portion that receives manifolding 218 which forms a part of the governor valve body for a fluid pressure governor mechanism indicated generally by reference character 220. This governor mechanism forms a part of the automatic control valve system.

The valve system comprises a main valve body 222 that may be situated in the transmission sump defined by the lower region of the housing 14. An oil pan closes an access opening formed in the lower portion of the housing 14.

First speed ratio operation can be obtained by engaging the forward drive clutch shown in part at 114 and 116. This connects drivably the turbine shaft 42 to the ring gear 118. Since the carrier 130 is connected to the driven shaft 12, rotation of the carrier is resisted. This causes sun gear 128 to rotate in a direction opposite to the direction of rotation of the ring gear 118. This reverse motion tends to cause the ring gear 144 for the second planetary gear unit 142 to rotate in a direction that corresponds to the direction of rotation of the turbine driven shaft 42. The reaction torque of the carrier for the gear unit 142 is transferred through brake drum 170 and through the overrunning brake shown at 186 to the transmission housing.

Intermediate speed ratio operation is achieved by keeping the forward multiple disc clutch assembly 114 and 116 engaged and by applying brake band 78. This anchors sun gear 128 thereby causing carrier 130 to rotate at an increased speed relative to the speed of the ring gear 118. Overrunning brake 186 freewheels under these conditions. A speed ratio transition from the lowest speed ratio to the intermediate speed ratio thus is accomplished simply by engaging a single friction torque establishing device; namely, the brake 78.

High speed, direct drive operation is achieved by engaging both clutches and by releasing the brake band 78 in sequence with the application of the clutches. Thus, the ring gear 118 becomes locked to the sun gear 128 and the elements of the gear units rotate in unison with a 1 to 1 speed ratio.

Reverse drive operation is achieved by releasing the forward drive clutch disc assembly 114 and 116, by applying direct and reverse clutch disc assembly and by engaging multiple disc brake assembly 196 and 198. Under these conditions, the engaged multiple disc clutch assembly transfers turbine torque from shaft 42 to the sun gear 128. The carrier for the rear planetary gear unit 142 acts as a reaction member and the ring gear 144 rotates in a direction opposite to the direction of rotation of the turbine. This, of course, causes reverse rotation of the shaft 12 at a reduced speed ratio.

The cylinder 188 includes a secondary portion 226. Cylinder 188 includes also a radially inward pressure region 228. Piston 190 includes two differential diameter positions 230 and 232 situated respectively in cylinder portions 226 and 228. A circular seal 234 in piston 190 surounds the radially inward circular sealing surface of the cylinder portion 228. The other seal 236 surrounds the piston portion 232 and is in sealing engagement with the outer annular surface of the cylinder portion 228.

A third seal 238 surrounds large diameter piston portion 230 and is in sealing engagement with the radially outward sealing surface of the annular cylinder portion 226.

Piston portion 232 and the radially inward cylinder portion 228 define a main fluid pressure cavity 240. Piston portion 230 and cylinder portion 226 define an auxiliary pressure cavity 242. Fluid communication is established between the two cavities 242 and 240 through a radially disposed passage 244 and a cooperating flow restricting orifice 246.

Formed in the piston portion 232 is an axial opening 248 having a small diameter portion 250. A ball check valve 252 is disposed in the opening 248 and is adapted to seat against an annular check valve seat formed by the discontinuity at the intersection of the main portion of opening 248 and the reduced diameter portion 250. The hight-hand end of the opening 248, as viewed in FIGURE 3, can be deformed by staking as shown at 254 to prevent removal of the ball 252 from the assembly.

The pressure cavity 226 is in fluid communication with a pressure feed passage 256, which is formed in the surrounding housing structure. The front pump 52 may form a pressure source for supplying pressure to passage 256 as well as to the other passages leading to the other servos in the system.

Shown also in FIGURE 2 is a quick release check valve 258. This includes a radial valve opening 260 which communicates with an axially extending opening or orifice 262. These openings 260 and 262 provide communication between the cavity 242 and the cavity 240.

The radially inward end of opening 260 defines an annular valve seat for a ball check valve element 264 which provides one-way fluid communication between the pressure cavities. Thus fluid flow can take place from cavity 240 to cavity 242 but flow in the opposite direction is inhibited. The fluid flow passage defined by the opening 260 and 262 bypasses the flow restricting orifice 246.

To establish reverse drive operation or to establish continuous operation of the low speed ratio, fluid pressure is admitted to passage 256. This causes the piston 190 to stroke with a rapid action since the volumetric capacity of the cavity 242 is relatively slight. The discs thus will be moved into frictional engagement rapidly with a fast-acting slack take-up motion. Because of the presence of the orifice 246, a pressure build-up in the cavity 240 will be delayed. Ultimately, however, cavity 240 becomes pressurized as fluid bleeds across the flow restricting orifice 246. As soon as a pressure develops in the cavity 240, valve 252 will become seated thereby trapping the residual air pocket in the cavity 240. The air pocket then acts as an inherent accumulating agent which makes possible a gradual force build-up on the piston 190.

We contemplate that the engaging force produced by the presence of the pressure in cavity 242 will not be sufficient to establish full engaging capacity. Thus the fast-acting, slack take-up motion will not be accompanied by engagement harshness or an undesirable inertia force reaction. The accumulating action produced by the air pocket occurs only during the latter portion of the engagement interval when a cushioning action is required.

Because of the delayed effect of the air pocket and the accompanying accumulating action during the latter stages of the engagement interval only, the total engagement time is not extended. When the pressure is released from passage 256, the piston return spring is effective to urge the piston 190 in a right-hand direction as viewed in FIGURE 2. This requires displacement of oil from the cavity 240. Since the orifice 246 provides only restricted fluid flow, the displacement of fluid is accomplished instead by valve 264 and passages 260 and 262. Valve 264 becomes unseated immediately upon release of pressure from passage 256. Thus a quick release of the piston 190 can be effected.

Upon application of pressure to passage 256, the piston 190 will stroke rather rapidly to the engaged position. The capacity of the orifice 246 is insufficient to permit filling of the cavity 240. To compensate for the increase in the volume due to the movement of the piston, the ball 252 becomes unseated and admits air into the cavity 240. It is this air that is used to effect the accumulating action.

In the construction shown at FIGURES 4, 5 and 5A, there is provided an annular piston and cylinder arrangement that corresponds to the piston and cylinder arrangement of FIGURES 1 through 3. The cylinder and piston construction of FIGURES 4, 5 and 5A includes an annular cylinder 266 and a cooperating piston 268. The piston 268 and the cylinder 266, unlike the FIGURE 2 construction, define a single annular working chamber 270. This may be supplied with fluid pressure through a feed passage such as that shown at 256 in the embodiment of FIGURES 1 through 3.

Piston 268 includes a first fluid seal 272 carried at its inner periphery and a corresponding fluid seal 274 is carried on the outer periphery of the piston 268. Seals 272 and 274 establish sealing engagement with the circular inner and outer surfaces of the annular cylinder 266.

Piston 268 is formed with a boss 276 within which is formed a circular opening 278. This opening communicates with a similar diameter opening 280. The juncture between the openings 278 and 280 defines a conical valve seat 282 for a ball check valve 284.

A star retainer washer 286 is pressed within the larger diameter end of the opening 278. Washer 286 is formed with peripheral grippers that grip the surrounding surface of the opening 278.

When fluid pressure is admitted to the chamber 270, a pressure is developed that causes piston 268 to move to a friction disc engaging position. When fluid pressure is relieved, an exhaust flow path is established through the feed passage and check valve 284 becomes unseated, thereby allowing the oil in the cavity 270 to be replaced by air admitted into the cavity through the check valve openings 278 and 280. When the servo is subsequently energized, pressure again is distributed to the cavity 270. At this time an air pocket exists in the cavity. As pressure develops, valve 284 becomes seated thereby trapping pocket of air in the cavity. It is this air that establishes an accumulating action.

The other elements in the embodiment of FIGURES 4, 5 and 5A that have counterparts in the FIGURE 2 construction have been identified by similar reference numerals, although prime notations are added.

Having thus described a preferred form of our invention, what we claim and desire to secure by U.S. Letters Patent is:

1. A friction brake comprising a stationary annular cylinder, an annular piston in said cylinder and cooperating therewith to define a pressure cavity, a passage means for controlling distribution of fluid pressure to said pressure cavity including a pressure feed passage communicating with said cavity at a location below the axis of said cylinder, said piston being adapted to move to a brake applying position as pressure builds up in said cavity, spring means for returning said piston to a release position as fluid is discharged from said cavity through said passage means, an air passage communicating with said cavity at a location proximate to the upper extremity of said cylinder, and a one-way flow valve means in said air passsage for allowing air to enter said cavity as fluid pressure is relieved in said cavity upon disengagement of said servo and the fluid flows under the influence of gravity from said cavity, said valve means inhibiting a flow of fluid through said air passage upon a pressure buildup in said cavity.

2. The combination as set forth in claim 1 wherein said annular cylinder comprises radially inward and radially outward portions, separate portions of said piston cooperating with said cylinder portions to define separate pressure cavities, said feed passage communicating with one pressure cavity and a restricted fluid flow passage interconnecting said cavities, said air passage communicating with said one cavity at its uppermost extremity.

3. A friction disc brake for anchoring a first member against a second stationary member, a first friction disc carried by said first member, a second friction disc carried by said second member in juxtaposed adjacent relationship with respect to said first disc, a stationary annular cylinder defined by said second member, an annular piston disposed in said cylinder and cooperating therewith to define a pressure cavity, passage means for controlling distribution and exhaust of pressure to and from said cavity including a feed passage located below the axis of said cylinder, said piston being adapted to apply a disc engaging pressure to said discs upon a pressure buildup in said cavity, an air passage communicating with said cavity at a location proximate to the upper extremity of said cylinder, and an air flow valve means in said air passage for admitting air into said cavity as fluid pressure is exhausted from said cavity and fluid is drained under the influence of gravity from said cavity through said feed passage, said air valve means inhibiting flow of fluid from said cavity to the exhaust region upon a pressure buildup in said cavity.

4. The combination as set forth in claim 3 wherein said annular cylinder comprises radially inward and radially outward portions, separate portions of said piston cooperating with said cylinder portions to define separate pressure cavities, said feed passage communicating with one pressure cavity and a restricted fluid flow passage interconnecting said cavities, said air passage communicating with said one cavity at its uppermost extremity.

5. A friction disc coupling mechanism for connecting a first torque delivery member to a second torque delivery member, a first friction disc carried by said first member, a second friction disc carried by said second member in juxtaposed, adjacent relationship with respect to said first disc, an annular cylinder defined by said second member, an annular piston disposed in said cylinder and cooperating therewith to define a pressure cavity, passage means for controlling distribution and exhaust of pressure to and from said cavity including a feed passage located at a lower region of said cylinder, said piston being adapted to apply a disc engaging pressure to said discs upon a pressure buildup in said cavity, an air passage communicating with said cavity at a location proximate to the upper extremity of said cylinder, an air flow valve means in said air passage for admitting air into said cavity as fluid pressure is exhausted from said cavity and fluid is drained under the influence of gravity from said cavity through said feed passage, said air valve means inhibiting flow of fluid from said cavity to the exhaust region upon a pressure buildup in said cavity, said annular cylinder comprising radially inward and radially outward portions, separate portions of said piston cooperating with said cylinder portions to define separate pressure chambers, said feed passage means communicating with one pressure chamber and a restricted fluid flow passage interconnecting said chambers, said air passage communicating with the other one chamber at its upper part, a bypass passage in parallel relationship with respect to said restricted flow passage interconnecting said chambers, and a one-way flow valve means in said bypass passage for permitting flow of pressurized fluid from the other of said chambers to said one chamber while inhibiting flow in the opposite direction.

6. A friction disc brake for anchoring a first member against a second stationary member, a first friction disc carried by said first member, a second friction disc carried by said second member in juxtaposed, adjacent relationship with respect to said first disc, a stationary annular cylinder defined by said second member, an annular piston disposed in said cylinder and cooperating therewith to define a pressure cavity, passage means for controlling distribution and exhaust of pressure to and from the cavity including a feed passage located at a lower region of said cylinder, said piston being adapted to apply a disc engaging pressure to said discs upon a pressure buildup in said cavity, an air passage communicating with said cavity at a location proximate to the upper extremity of said cylinder, an air flow valve means in said air passage for admitting air into said cavity as fluid pressure is exhausted from said cavity and fluid is drained under the influence of gravity from said cavity through said feed passage, said air valve means inhibiting flow of fluid from said cavity to the exhaust region upon a pressure buildup in said cavity, said annular cylinder comprising radially inward and radially outward portions, separate portions of said piston cooperating with said cylinder portions to define separate pressure chambers, said feed passage communicating with one pressure chamber and a restricted fluid flow passage interconnecting said chambers, an air passage communicating with the other pressure chamber near its upper part, a bypass passage in parallel relationship with respect to said restricted flow passage interconnecting said chambers, and a one-way flow valve means in said bypass passage for permitting flow of pressurized fluid from the other of said chambers to said one chamber while inhibiting flow in the opposite direction.

References Cited

UNITED STATES PATENTS

| | | | |
|---|---|---|---|
| 2,632,544 | 3/1953 | Hockert | 192—109 X |
| 2,740,512 | 4/1956 | Fischer | 192—85 |
| 2,916,122 | 12/1959 | Hindmarch | 192—109 X |
| 2,954,040 | 9/1960 | Bolster | 192—85 X |
| 3,083,588 | 4/1963 | Christenson | 188—152.10 |
| 3,273,415 | 9/1966 | Frost | 192—85 X |

BENJAMIN W. WYCHE III, *Primary Examiner.*